(12) United States Patent
Nguyen-Kim et al.

(10) Patent No.: US 7,807,725 B2
(45) Date of Patent: Oct. 5, 2010

(54) FOAM REGULATING AGENT BASED ON CATIONIC URETHANE OLIGOMERS

(75) Inventors: Son Nguyen-Kim, Hemsbach (DE); Ralf Nörenberg, Ingelheim (DE)

(73) Assignee: BASF Aktiengesellschaft, Ludwigshafen am Rhein (DE)

( * ) Notice: Subject to any disclaimer, the term of this patent is extended or adjusted under 35 U.S.C. 154(b) by 825 days.

(21) Appl. No.: 10/569,809

(22) PCT Filed: Aug. 27, 2004

(86) PCT No.: PCT/EP2004/009574

§ 371 (c)(1),
(2), (4) Date: Feb. 27, 2006

(87) PCT Pub. No.: WO2005/021613

PCT Pub. Date: Mar. 10, 2005

(65) Prior Publication Data

US 2006/0263324 A1 Nov. 23, 2006

(30) Foreign Application Priority Data

Aug. 27, 2003 (DE) ................. 103 39 479

(51) Int. Cl.
*C09K 3/00* (2006.01)
(52) U.S. Cl. .................. 516/131; 424/70.17
(58) Field of Classification Search .................. 516/131
See application file for complete search history.

(56) References Cited

U.S. PATENT DOCUMENTS 3,873,484 A * 3/1975 Bluestein et al. ............ 524/874
4,068,035 A * 1/1978 Violland et al. ............... 442/93

FOREIGN PATENT DOCUMENTS

| DE | 1 178 586 | 9/1964 |
|---|---|---|
| DE | 2 347 677 | 6/1974 |
| DE | 26 17 589 | 10/1976 |
| EP | 0 596 503 | 5/1994 |
| EP | 1 353 005 | 10/2003 |
| WO | 94/16044 | 7/1994 |
| WO | 01/76729 | 10/2001 |

OTHER PUBLICATIONS

Garrett, P.R., "Defoaming Theory and Industrial Applications", Surfactant Science Series 45, pp. 1-117 (1993).
Garrett, P.R., "Defoaming Theory and Industrial Applications", Surfactant Science Series 45, pp. 1-117 (1993).

* cited by examiner

*Primary Examiner*—Ling-Siu Choi
*Assistant Examiner*—Chun-Cheng Wang
(74) *Attorney, Agent, or Firm*—Oblon, Spivak, McClelland, Maier & Neustadt, L.L.P.

(57) ABSTRACT

The present invention relates to a cationic poly(ether-urethane) constructed from
a) at least one polyetherol, as component A;
b) at least one tertiary amine-containing or ammonium-containing diol, as component B;
c) at least one diisocyanate as component C;
d) optionally at least one short-stopper, as component D;
where the cationic poly(ether-urethane) has an amine number of from 5 to 40.

Furthermore, the present invention relates to a process for the preparation of the cationic poly(ether-urethanes), according to the invention, to compositions comprising the cationic poly(ether-urethanes) according to the invention and also at least one anionic surfactant, to a method of foam regulation, in particular for suppressing foam or for defoaming using at least one cationic poly(ether-urethane) according to the invention, to the use of the cationic poly(ether-urethane) according to the invention for foam regulation, in particular as foam suppressor or defoamer.

18 Claims, No Drawings

FOAM REGULATING AGENT BASED ON CATIONIC URETHANE OLIGOMERS

The present invention relates to cationic poly(ether-urethanes), to a process for their preparation, to compositions comprising the cationic poly(ether-urethanes) according to the invention, and at least one anionic surfactant, to a method of foam regulation, in particular for suppressing foam or for defoaming using at least one cationic poly(ether-urethane) according to the invention, to the use of the cationic poly (ether-urethane) according to the invention for foam regulation, in particular as foam suppressor or defoamer.

Surfactants (surface-active compounds) play, inter alia due to their property of enabling aqueous phases and oil phases to mix, an essential role in numerous applications. A known property of surfactant solutions is their tendency to generate foam, in particular upon agitation of the solutions.

There are applications in which the formation of foam is undesired, i.e. in these applications a reduction, suppression or elimination of foam is desirable. In washing machines, for example, cleaning compositions are desirable which are only low-foam. Other applications in which the formation of foam is undesired are, for example, coatings, in which the formation of foam may have a disadvantageous effect on the appearance of the coatings, machine bottle washing and further applications in which the formation of foam impairs the cleaning efficiency and/or causes watermarks.

Customarily used defoamers for washing compositions are used, for example, in the form of a coating on sodium carbonates particles. These materials are powders which can be mixed in the dry state with various pulverulent cleaning composition formulations. Such defoamer materials are, for example, defoamers based on silicone on inorganic carriers, which are used in pulverulent cleaning compositions.

Although these customary defoamers have a certain effectiveness in suppressing foam when they are used together with pulverulent cleaning compositions, they are unsuitable for use in liquid cleaning compositions. In the prior art, soap is used as defoamer in liquid cleaning compositions. The soap interacts with the ions of hard water and forms insoluble particles which are able to suppress the formation of foam. The defoamer properties of soap are thus dependent on the ions of hard water, meaning that the use of soap as defoamer is of little success when soft water is used. Furthermore, defoamers based on silicone have already been used in liquid systems, such as cleaning compositions, dispersions, emulsions and cosmetics, although compatibility problems arise.

As well as these hydrophobic particles there are further technologies. For example, hydrophobic surfactants which, under the use conditions, form oil lenses in the foam lamellae, oil or grease particles, in particular silicone oils, defoam. An overview of the various defoaming technologies is given by P. R. Garrett in "Defoaming. Theory and Industrial Application", P. R. Garrett (ed.), Surfactant Science Series 45, 1993, 1-117.

WO 01/76 729 relates to compositions comprising at least one anionic surfactant and at least one multifunctional polyetheramine which contains at least two amino groups per molecule and have a molecular weight of at least 1000, in which each amino group is a secondary or tertiary amino group. The multifunctional polyetheramine serves as a foam suppressor in these compositions.

It is an object of the present invention to provide new types of compound which are suitable as foam regulating agents, in particular as defoamers and/or foam suppressors in formulations which comprise at least one anionic surfactant.

We have found that this object is achieved by a cationic poly(ether-urethane) constructed from
a) at least one polyetherol, as component A;
b) at least one tertiary amine-containing or ammonium-containing diol, as component B;
c) at least one diisocyanate as component C;
d) optionally at least one short-stopper, as component D;
where the cationic poly(ether-urethane) has an amine number of from 5 to 40.

It has been found that certain cationic poly(ether-urethanes) are suitable to act as foam regulating agents, in particular as defoamers and/or foam suppressors in compositions which comprise at least one anionic surfactant.

For the purposes of the present application, defoamer is understood as meaning a substance which is suitable for reducing or completely removing existing foam. Foam suppressor is understood as meaning a substance which is suitable for at least partially or completely suppressing the formation of foam.

The cationic poly(ether-urethane) according to the invention has an amine number of from 5 to 40, preferably 10 to 30, particularly preferably 10 to 25. The amine number was measured by means of the method described in DIN 16945.

The polyurethanes generally have a K value in accordance with H. Fikentscher (determined in 0.1% strength by weight solutions in N-methylpyrrolidone at 25° C. and pH 7) of from 15 to 40.

The glass transition temperature of the poly(ether-urethanes) according to the invention is generally <20° C., preferably <15° C., particularly preferably <5° C. The glass transition temperature was determined in accordance with ASTM D 3418.

In a preferred embodiment, the present application relates to a cationic poly(etherurethane) comprising
a) 50 to 90% by weight, preferably 55 to 85% by weight, particularly preferably 60 to 80% by weight, of component A;
b) 1 to 10% by weight, preferably 2 to 7% by weight, particularly preferably 2.5 to 5% by weight, of component B;
c) 9 to 25% by weight, preferably 14 to 23% by weight, particularly preferably 17 to 21 % by weight, of component C;
d) 0 to 15% by weight, preferably 0.1 to 10% by weight, particularly preferably 0.3 to 5% by weight, of component D,
where the total sum of components A, B, C and optionally D is 100% by weight.

The cationic poly(ether-urethanes) according to the invention are, due to their cationic groups, particularly in the case of the presence of charges, generally readily soluble in alcohol and water or at least dispersible in alcohols and water without the assistance of emulsifiers. Suitable alcohols here are, in particular, short-chain alcohols, such as methanol, ethanol, isopropanol or n-propanol. Furthermore, the cationic poly(ether-urethanes) according to the invention are, in a preferred embodiment, soluble or dispersible in oils. Suitable oils are, for example, paraffin oils, such as diesel oil and cosmetic oils, such as essential oils.

For the use of the poly(ether-urethanes) according to the invention as foam regulating agents, in particular as defoamers and/or foam suppressors, the amine number of the poly(ether-urethanes)—and thus the charge density—is of decisive importance. Without being bound to mechanistic ideas which may be associated with the following statement, the following was found: if the charge density is too high, then the polymers precipitate out together with the anionic surfactants. If the charge density is too low, then the interaction of the poly(ether-urethanes) with the anionic surfactants is insufficient.

Component A

Suitable polyetherols are chosen from the group consisting of poly($C_3$- to $C_5$-)glycols, polytetrahydrofuran, mixtures of the abovementioned compounds and mixtures of at least one of the abovementioned compounds with polyethylene glycol. Poly($C_3$- to $C_5$-)glycols are understood as meaning polyalkylene glycols whose alkylene groups are constructed from three, four or five carbon atoms. Such polyalkylene glycols are polypropylene glycol, polybutylene glycol and polypentylene glycol. The suitable poly($C_3$- to $C_5$-)glycols generally have a molecular weight of from 200 to 5000, preferably 450 to 3000, particularly preferably 500 to 1500, determined from the OH number in accordance with DIN 53240.

Suitable polytetrahydrofurans generally have a molecular weight of from 250 to 3000, preferably 450 to 2000, particularly preferably 500 to 1200, determined from the OH number in accordance with DIN 53240.

It is likewise possible to use, as component A, mixed polyalkylene glycols which are obtained by polymerization of different alkylene oxides, such as propylene oxide, butylene oxide, pentylene oxide and/or ethylene oxide. The alkylene oxide units may be randomly distributed in the polyalkylene glycol obtained or be copolymerized in the form of blocks. Also suitable as component A are copolymers of at least one alkylene oxide, such as ethylene oxide, propylene oxide, butylene oxide or pentylene oxide, with THF, where the alkylene oxide and THF units may be randomly distributed in the copolymer obtained or be copolymerized in the form of blocks—which is preferable. The proportion of the at least one alkylene oxide unit in the copolymer is preferably at most 30% by weight.

Very particular preference is given to using polypropylene glycol and ethylene oxide/propylene oxide block copolymers as component A. The proportion of ethylene oxide units in the ethylene oxide/propylene oxide block copolymers is preferably <40% by weight, particularly preferably <20% by weight.

The preparation of the specified polyalkylene glycols, and of polytetrahydrofuran, of the abovementioned mixtures and copolymers is known to the person skilled in the art.

Component B

Suitable components B are diols, aminoalcohols, diamines or triamines with at least one quaternary or protonated or protonatable amine nitrogen atom. Preference is given to using at least one compound of the formulae I to VIII

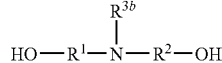
(I)

(II)

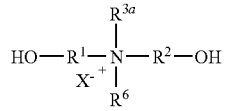
(III)

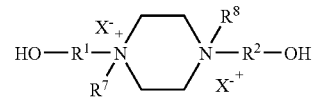
(IV)

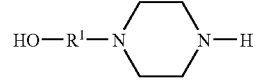
(V)

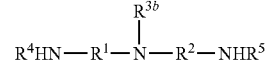
(VI)

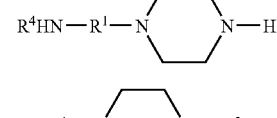
(VII)

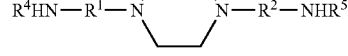
(VIII)

in which
$R^1$ and $R^2$ are alkylene, preferably $C_2$- to $C_8$-alkylene,
$R^{3a}$, $R^6$ and $R^7$, $R^8$ are alkyl, aryl, alkylaryl or arylalkyl, preferably $C_1$- to $C_4$-alkyl, phenyl or $C_7$- to $C_{10}$-phenylalkyl,
$R^4$ and $R^5$ are hydrogen or $C_7$- to $C_4$-alkyl,
$R^{3b}$ is $C_1$- to $C_{18}$-alkyl, phenyl or $C_7$- to $C_{10}$-phenylalkyl, and
$X^-$ is chloride, bromide, iodide, $C_1$- to $C_4$-alkyl sulfate or half the stoichiometric amount of sulfate.

$C_2$- to $C_8$-alkylene are, for example, understood as meaning 1,2-ethylene, 1,3-propylene, 1,4-butylene, 2,2-dimethyl-1,3-propylene, 1,2-propylene, 1,2-butylene, 2,3-butylene, pentamethylene, hexamethylene, heptamethylene or octamethylene. $C_1$- to $C_4$-alkyl are, for example, understood as meaning methyl, ethyl, n-propyl, isopropyl, n-butyl, isobutyl, sec-butyl or tert-butyl, preferably methyl and ethyl. $C_7$- to $C_{10}$-phenylalkyl are, for example, understood as meaning benzyl, 2-phenylethyl, o-, m- and p-methylbenzyl, 3-phenylpropyl or 4-phenylbutyl, preferably benzyl and 2-phenylethyl. $C_1$- to $C_{18}$-alkyl are, for example, understood as meaning methyl, ethyl, isopropyl, n-propyl, n-butyl, isobutyl, sec-butyl, tert-butyl, n-pentyl, isopentyl, neopentyl, the various isomers of hexyl, heptyl, octyl, nonyl, decyl, undecyl, dodecyl, tridecyl, tetradecyl, pentadecyl, hexadecyl and octadecyl radicals. The $C_1$- to $C_{18}$-alkyl radicals may be linear or branched.

Component B is preferably chosen from the group consisting of at least one amine-containing or ammonium-containing diol of the formulae I to IV,

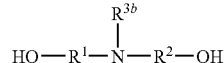
(I)

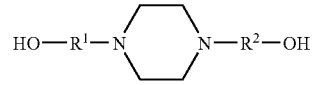
(II)

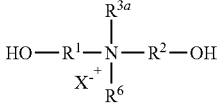
(III)

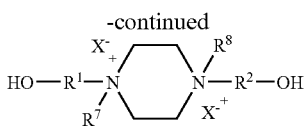

in which the symbols have the meanings already given above.

Very particular preference is given to using compounds of the formula I as component B in which the radicals $R^1$, $R^2$ and $R^{3a}$ and $R^{3b}$ have the meanings given above. Preferably, $R^1$ and $R^2$ are $C_2$- to $C_8$-alkylene and $R^3a$ is $C_1$- to $C_{18}$-alkyl, particularly preferably $C_1$- to $C_4$-alkyl and $R^{3b}$ is $C_1$- to $C_{18}$-alkyl, particularly preferably $C_1$- to $C_4$-alkyl. Component B is very particularly preferably chosen from the group consisting of diethanolamines, in particular methyldiethanolamine.

Component C

In principle, all diisocyanates are suitable as component C. Component C is preferably chosen from the group consisting of $C_2$- to $C_8$-alkylene diisocyanates, such as 1,2-ethylene diisocyanate, 1,4-butylene diisocyanate, hexamethylene diisocyanate, octamethylene diisocyanate; $C_5$- to $C_{10}$-cycloalkylene diisocyanates such as 1,3-pentylene diisocyanate, 1,3-cyclohexylene diisocyanate, 1,4-cyclohexylene diisocyanate, isophorone diisocyanate; o-, m-, p-phenylene diisocyanate and ($C_1$- to $C_4$-alkyl)phenylene diisocyanates, such as tolylene diisocyanate. ($C_1$- to $C_4$-alkyl)phenylene diisocyanates are understood as meaning phenylene diisocyanates whose phenylene group carries one or more, preferably one, $C_1$- to $C_4$-alkyl radical. Preferred diisocyanates are $C_2$- to $C_8$-alkylene diisocyanates, particularly preferably hexamethylene diisocyanate.

Component D

The cationic poly(ether-urethanes) according to the invention are characterized by a relatively low molecular weight. In order to obtain such cationic poly(ether-urethanes) with a relatively low molecular weight, short-stoppers can be added as component D during the preparation of the cationic poly (ether-urethane). Suitable short-stoppers are known to the person skilled in the art. Short stoppers are preferably chosen from the group consisting of monofunctional amines, monofunctional alcohols, water and monofunctional thiols. Particular preference is given to using tertiary amine-containing diols, such as dimethylaminoalkylamines, preference being given to $C_2$- to $C_5$-alkyl radicals, in particular dimethylaminopropylamine. In addition, preference is given to using dimethylethanolamine and monofunctional alcohols as short-stoppers. It is, however, also possible to obtain cationic poly (ether-urethanes) with a relatively low molecular weight without adding short-stoppers. As a result of impurities present in the reaction mixture, in particular water, poly (ether-urethanes) with a relatively low molecular weight can be obtained without adding short-stoppers. ps Preparation of the poly(ether-urethanes)

The cationic poly(ether-urethanes) according to the invention are generally prepared by the process known to a person skilled in the art. Preferably, the cationic poly(ether-urethanes) according to the invention are obtainable by reacting the reactants of the diisocyanates (component C) with the diisocyanates under an inert gas atmosphere in an aprotic solvent, for example acetone or methyl ethyl ketone, preferably under intrinsic pressure, at temperatures of generally 50 to 130° C., preferably 60 to 100° C., particularly preferably 70 to 85° C. The reaction can be accelerated where appropriate by adding customary catalysts. Preferred catalysts are amine-containing compounds, such as 1,4-diaza(2,2,2)bicyclooctane (DABCO). The components A, B, C and optionally D are used in the amounts already specified above.

The poly(ether-urethanes) obtained are then quaternized or protonated if a quaternized or protonated compound has not already been used as component B, for example compound II, IV or VIII.

The present application thus further provides a process for the preparation of a cationic poly(ether-urethane) according to the invention, by reacting the at least one polyetherol and the at least one tertiary amine-containing or ammonium-containing diol with the at least one diisocyanate under an inert gas atmosphere in an aprotic solvent, where necessary with the addition of customary catalysts, and subsequent quaternization or protonation if a quaternized or protonated tertiary ammonium-containing diol has not already been used.

The protonation or quaternization generally takes place in a solvent at room temperature or at elevated temperature, generally up to 50° C., where appropriate under pressure. Suitable solvents are, in particular, water and mixtures of water and water-miscible solvents, such as alcohols, ketones or cyclic ethers, for example ethanol, isopropanol, acetone, methyl ethyl ketone, dioxane or acetonitrile. The concentration of the solution is governed only by the solubility behavior of the basic starting polyurethane mass and of the salt-like end product.

Acids suitable for the protonation are, in principle, water and all compounds with an acidic reaction, i.e. mineral acids or organic acids, in particular carboxylic acid, phosphoric acids or sulfonic acids, and salts thereof. Preference is given to using carboxylic acids, in particular lactic acid. During the protonation, acid is added according to the invention until the tertiary amino groups of the poly(ether-urethane) are completely or partially neutralized, generally to a pH of from 6 to 7.5.

The quaternization can take place, for example, with alkylating agents, such as $C_1$- to $C_4$-alkyl halides or sulfates. Examples of such alkylating agents are ethyl chloride, ethyl bromide, methyl chloride, methyl bromide, dimethyl sulfate and diethyl sulfate, particular preference being given to methyl chloride, dimethyl sulfate and diethyl sulfate.

Due to their cationic groups, the poly(ether-urethanes) according to the invention are generally readily alcohol- and water-soluble or at least dispersible in water and alcohol without the assistance of emulsifiers. Alcohols are understood here as meaning, in particular, short-chain alcohols, such as methanol, ethanol, isopropanol or n-propanol.

The poly(ether-urethanes) according to the invention are suitable, in particular, as foam regulating agents, i.e. as defoamers and/or foam suppressors.

The present application thus further provides a liquid or solid composition comprising i) at least one cationic poly(ether-urethane) according to the invention, ii) at least one anionic surfactant, iii) optionally a liquid medium, and iv) optionally further auxiliaries and additives.

Whereas surfactants are added deliberately in washing and cleaning compositions in order to facilitate wetting and emulsifying processes, in other formulations, for example coatings, surfactants are added to the formulation via polymer dispersions. Polymer dispersions per se are also preferred formulations.

The preparation of the composition according to the invention is known to the person skilled in the art. It is generally carried out by mixing the individual components. The composition according to the invention particularly preferably comprises i) 0.01 to 17% by weight, preferably 0.2 to 10% by weight, particularly preferably 0.2 to 2.5% by weight, of the at least one cationic poly(ether-urethane), ii) 0.01 to 83% by weight, preferably 0.1 to 60% by weight, particularly preferably 0.5 to 47.5% by weight, of the at least one anionic surfactant, iii) 0 to 99.98% by weight, preferably 30 to 99.7% by weight, particularly preferably 50 to 99.3% by weight, of the liquid medium, where the total sum of components according to i), ii) and iii) is 100% by weight, iv) optionally further auxiliaries and additives. ps Cationic poly(ether-urethane)

The cationic poly(ether-urethane) according to the invention has been described in detail above. In the compositions according to the invention, all of the above-described cationic poly(ether-urethanes) are suitable. Preferred cationic poly(ether-urethanes) are likewise already specified above.

Anionic Surfactant

Suitable anionic surfactants are all anionic surfactants known to the person skilled in the art. The anionic surfactants preferably have a $pK_a$ value of <7. The anionic surfactants are particularly preferably chosen from at least one compound from the group consisting of linear alkylbenzenesulfonates, branched alkylbenzenesulfonates, alkylsulfonates whose alkyl groups may be linear or branched and preferably have 8 to 22, particularly preferably 12 to 15, carbon atoms, ether sulfates whose alkyl groups may be linear or branched and preferably have 10 to 16 carbon atoms, xylylsulfonates, alcohol sulfates, phosphonates, alkyl phosphates, naphthylsulfonates, secondary alkyl sulfates, α-olefinsulfonates, sulfosuccinates, isethionates, carboxylates, alkylated diphenyl oxide disulfonates and soaps. Most of these anionic surfactants are usually supplied in the form of their ammonium and sodium salts, although anionic surfactants with other cations can also be used.

a) Alkylbenzenesulfonates

The alkylbenzenesulfonates suitable as anionic surfactants in the compositions according to the invention can be variable with regard to their molecular weight, the alkyl chain length, and the position of the phenyl group on the alkyl chain. Suitable alkylbenzenesulfonates are listed, for example, in WO 01/76729 and the citations specified therein.

Linear alkylbenzenesulfonates ("LAS") are often customarily used in commercial cleaning products due to their effectiveness as cleaning agents, their ready biode-gradability and their relatively low costs. The linear alkylbenzenesulfonates can be produced by sulfonation of linear alkylbenzene intermediates. Linear alkylbenzenes are prepared by processes known in the prior art, generally either by means of aluminum trichloride catalysts or hydrogen fluoride catalysts.

The linear alkylbenzenesulfonates used in preference in the compositions according to the present invention preferably have linear alkyl chains with 8 to 22 carbon atoms, particularly preferably 8 to 16 carbon atoms.

Particularly suitable linear alkylbenzenesulfonates are listed in WO 01/76729. Weakly branched alkylbenzenesulfonates, as described in WO 00/39058 and WO 99/05242, are also suitable.

b) Further Suitable Anionic Surfactants

Further anionic surfactants suitable for use in the compositions according to the invention are likewise listed in WO 01/76729.

In addition, alkylated diphenyl oxide disulfonates are suitable which are commercially available under the name Doxfax® from Dow. Also suitable are anionic surfactants which are usually used in emulsion polymerization. Suitable anionic surfactants for the emulsion polymerization are known to the person skilled in the art.

Liquid Medium

Suitable liquid media are, for example, those media which are suitable for dissolving anionic surfactants. Examples of suitable liquid media are water, cyclic carbonates, oils, such as paraffin oils, for example diesel oil, cosmetic oils, for example essential oils, pine oil, methyl ester, limonene, aliphatic and aromatic hydrocarbons or mixtures of said liquid media. Water, alkyl alcohols with 1 to 6 carbon atoms, in particular straight-chain alkyl alcohols, for example methanol, ethanol, n-propanol, n-hexanol, branched alkyl alcohols containing 3 to 6 carbon atoms, for example isopropanol and sec-butanol, glycols, for example propylene glycol, diglycols, for example propylene diglycol, and triglycols, for example triethylene glycol, glycol ethers, for example butylene glycol diethyl ether and dipropylene glycol methyl ether, in particular, are suitable. Very particular preference is given to using water as liquid medium. The reactive solvents used in coatings, for example bisphenol A ethoxylates, can also be used.

Auxiliaries and Additives

Examples of auxiliaries and additives which may be used are nonionic surfactants. Suitable nonionic surfactants are, for example, nonylphenol ethoxylates, alcohol ethoxylates, ethylene oxide/propylene oxide block copolymers, alcohol ethylene oxide/propylene oxide adducts and mixtures thereof. Specific suitable nonionic surfactants are specified, for example, in WO 01/76729.

Suitable further auxiliaries and additives are, for example, dyes, fragrances, fillers, particles in the form of dispersions, oils in the form of emulsions, active ingredients in molecularly dissolved form, solubilized, in the form of a dispersion, emulsion or suspoemulsion, dispersion auxiliaries, for example water-soluble polymers, and thickeners. The compounds suitable for the particular composition are known to the person skilled in the art. Also suitable, for example, are optical brighteners, dye transfer inhibitors, enzymes, builders, chelating reagents and other additives known to the person skilled in the art and suitable for use in surfactant compositions.

Due to the cationic poly(ether-urethane) used according to the invention, the compositions according to the invention have a reduced foam formation, or a reduction in foam formed, or are suitable for foam regulation.

The cationic poly(ether-urethane) according to the invention thus serves as foam regulating agent.

The present invention thus provides a method of foam regulation, in particular for suppressing and/or reducing foam in a system comprising a liquid medium, preferably water, and at least one anionic surfactant, and optionally further auxiliaries and additives by adding at least one cationic poly(ether-urethane) constructed from a) at least one polyetherol, as component A,
b) at least one tertiary aminodiol, as component B,
c) at least one diisocyanate, as component C, and
d) optionally at least one short-stopper, as component D.

Preferred cationic poly(ether-urethanes), solvents and anionic surfactants, and suitable auxiliaries and additives have already been specified above.

The cationic poly(ether-urethane) can be added to the composition before foam appears. It is, however, likewise possible to only add the cationic poly(ether-urethane) when foam has already formed.

The present invention further provides for the use of the cationic poly(ether-urethane) as foam regulating agent, in particular as defoamer and/or foam suppressor in systems comprising a liquid medium, preferably water, and at least one anionic surfactant, and optionally further auxiliaries and additives.

As already mentioned above, the cationic poly(ether-urethane) can be used by it already being present in the compositions whose foam formation is to be controlled prior to foam appearing. The cationic poly(ether-urethane) can, however, likewise be added after foam has appeared.

Preferred cationic poly(ether-urethanes), solvents, anionic surfactants and suitable auxiliaries and additives have already been specified above.

The cationic poly(ether-urethanes) according to the invention can be used in all compositions comprising at least one anionic surfactant in which foam regulation, in particular defoaming and/or foam suppression, is desired. Such compositions are preferably cleaning compositions for machine cleaning or manual cleaning of laundry, dishes, bottles and/or automobiles, dispersions, in particular adhesive dispersions, coatings or color dispersions, emulsions, cosmetics, fermentation froths and agrochemical formulations. Suitable components of these compositions as well as the cationic poly(ether-urethane) according to the invention are known to the person skilled in the art.

The present invention thus further provides for the use of a cationic poly(ether-urethane) according to the invention for controlling foam formation in systems comprising a liquid medium, preferably an aqueous medium, and at least one anionic surfactant, and optionally further auxiliaries and additives. Foam formation is preferably controlled by defoaming or suppression of foam formation.

Preferred systems, in particular aqueous systems, have already been specified above.

The examples which follow additionally explain the invention.

EXAMPLES

Preparation of the Cationic poly(ether-urethanes) According to the Invention

Example 1

| Feed materials: | 58.5 g (0.065 mol) | Pluriol P900 |
|---|---|---|
| | 4.2 g (0.035 mol) | N-methyldiethanolamine (N-MDEA) |
| | 20 g | methyl ethyl ketone (MEK) |
| | 0.2 g | 1,4-diaza(2,2,2)bicyclooctane (DABCO) |
| | 16.8 g (0.1) | hexamethylene diisocyanate (HDI) |
| | 3.9 g | lactic acid (90% strength) |
| | 80 g | water |

58.5 g of Pluriol P900, 4.2 g of N-MDEA and 0.2 g of DABCO are initially introduced into 20 g of MEK. The initial charge is heated to a temperature of about 65° C. with stirring. Hexamethylene diisocyanate is metered in over 15 minutes. During this time, the mixture becomes slightly exothermic. The reaction mixture is then stirred for a further 3 to 5 hours at 80° C. until the NCO content is constant.

The reaction melt is then neutralized with lactic acid/water and diluted. Methyl ethyl ketone is removed under reduced pressure. This gives a slightly opaque approximately 50% strength dispersion.

Examples 2-4 were carried out according to a corresponding procedure, the various examples differing by virtue of the features given in Table 1 below:

Table 1 shows the composition of cationic poly(ether-urethanes) according to the invention, and the protonating agent used.

TABLE 1

| Example | Pluriol P900 (mol) | N-MDEA (mol) | N,N-DMEA (mol) | HDI (mol) | Neutralizing agent | K value |
|---|---|---|---|---|---|---|
| 1 | 6.5 | 3.5 | — | 10 | lactic acid | 25 |
| 2 | 7.5 | 2.5 | — | 10 | lactic acid | 23.8 |
| 3 | 8 | 0.6 | 2.8 | 10 | lactic acid | 22.4 |
| 4 | 6.7 | 2.0 | 2.4 | 10 | lactic acid | 21.2 |

Pluriol P900: polypropylene glycol Mw weight-average molecular weight≈900 g/mol
N-MDEA: n-methyldiethanolamine
N,N-DMEA: dimethylethanolamine
HDI hexamethylene diisocyanate
K value K value in accordance with H. Fikentscher (determined in 1% strength by weight solutions in N-methyl-pyrrolidone at 25° C. and pH 7) (1% strength)

Example 5

The cationic poly(ether-urethanes) according to the invention as in Examples 1 to 4 were tested in a circulation foam test (CNOMO foam test; provisional EU standard: prEN14371).

Experimental conditions: 25° C.
200 l/h pass (knob position: 7.0)
pump for 10 minutes; leave to stand for 5 minutes;
500 ml liquor (with bidistilled water)
0.1 g/l Lutensol A-LBN 50 (alkylbenzenesulfonate Na salt)
0.005 g/l polyurethane Table 2 below shows the experimental results, no defoamer or foam suppressor being added in comparative experiment 1.

TABLE 2

| Time in s | PU from Example 1 | PU from Example 2 | PU from Example 3 | PU from Example 4 | Comparison |
|---|---|---|---|---|---|
| 0 | 400 | 400 | 400 | 400 | 400 |
| 10 | 1180 | 760 | 1125 | 1200 | 1240 |
| 15 | 880 | 400 | 840 | 900 | 1100 |

It can be seen that the cationic poly(ether-urethanes) (PU) according to the invention either suppress the foam volume (Example 2) or reduce the foam stability (Examples 1, 2 and 4).

Example 6

Defoaming a Heavy-Duty Detergent

A standard commercial detergent formulation (anionic surfactant, nonionic surfactant, zeolite, fillers) was investigated in the whipped-foam test (EN 12728; measurement conditions: 2% by weight of surfactant, 25° C., 200 ml liquor).

a) without defoamer
b) 0.5% by weight of the cationic poly(ether-urethane) from Example 3
c) commercial product (standard commercial detergent)

The following foam volumes were measured:
a) 175 cm$^3$
b) 90 cm$^3$
c) 150 cm$^3$

We claim:

1. A method of suppressing a foam in a liquid medium, the method comprising
adding at least one cationic poly(ether-urethane) to the liquid medium to suppress the foam in the liquid medium,
wherein the at least one cationic poly(ether-urethane) comprises monomer units of
a) 50 to 90% by weight of at least one polyetherol, as component A;
b) 1 to 10% by weight of at least one quaternary amine-comprising, tertiary amine-comprising and/or ammonium-comprising diol, as component B;
c) 9 to 25% by weight of at least one diisocyanate as component C; and
d) 0.1 to 10% by weight of at least one short-stopper, as component D;
wherein the total sum of components A, B, C, and D is 100% by weight,
wherein the cationic poly(ether-urethane) has an amine number of from 5 to 40 and a K-value according to Fikentscher of from 15 to 40;
wherein the liquid medium comprises at least one anionic surfactant, and optionally, further auxiliaries and additives, and
wherein, when only the tertiary amine-comprising diol is employed as the component B, after incorporating components A-D as monomers in a polymer, the tertiary amine in the tertiary amine-comprising diol monomer is either protonated or quaternized to form the at least one cationic poly(ether-urethane).

2. The method of claim 1, wherein the liquid medium further comprises water.

3. A cationic poly(ether-urethane) comprising monomer units of
a) 55 to 85% by weight of at least one polyetherol, as component A;
b) 2 to 7% by weight of at least one quaternary amine-comprising, tertiary amine-comprising and/or ammonium-comprising diol, as component B;
c) 14 to 23% by weight of at least one diisocyanate as component C; and
d) 0.1 to 10% by weight of at least one short-stopper selected from the group consisting of monofunctionel amines, water and thiols, as component D,
wherein the cationic poly(ether-urethane) has an amine number of from 10 to 25, and the total sum of components A to D is 100% by weight,
wherein, when only the tertiary amine-comprising diol is employed as component B, after incorporating components A-D as monomers in a polymer, the tertiary amine in the tertiary amine-comprising diol monomer is either protonated or quaternized to form the at least one cationic poly(ether-urethane), and
wherein the cationic poly(ether-urethane) has a K-value according to Fikentscher of from 15 to 40.

4. The cationic poly(ether-urethane) as claimed in claim 3, comprising monomer units of
a) 60 to 80% by weight of component A;
b) 2.5 to 5% by weight of component B;
c) 17 to 21% by weight of component C; and
d) 0.3 to 5% by weight of component D,
wherein the sum of components A to D is 100% by weight.

5. The cationic poly(ether-urethane) as claimed in claim 3, wherein the component A is selected from the group consisting of polypropyleneglycol block copolymers and ethyleneoxide/propyleneoxide block copolymers.

6. The cationic poly(ether-urethane) of claim 3, wherein the component B is selected from the group consisting of at least one compound of the formula I, at least one compound of formula II, at least one compound of formula III, at least one compound of formula IV, and combinations thereof

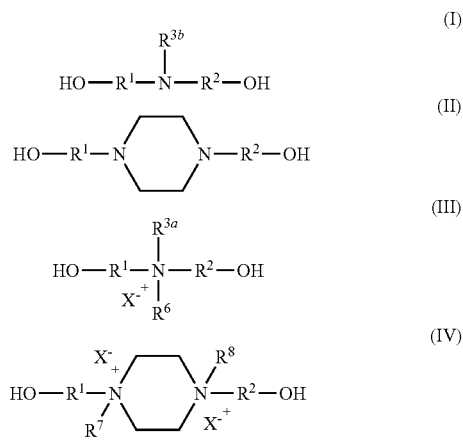

wherein
$R^1$ and $R^2$ are alkylene, and $R^3$, $R^6$, $R^7$ and $R^8$ are alkyl, aryl, alkylaryl or arylalkyl.

7. The cationic poly(ether-urethane) as claimed in claim 3, wherein the component C is selected from the group consisting of $C_2$- to $C_8$-alkylene diisocyanates, $C_5$- to $C_{10}$-cycloalkylene diisocyanates and ($C_1$- to $C_4$-alkyl)phenylene diisocyanates.

8. A composition comprising
i) at least one cationic poly(ether-urethane) as defined in claim 1,
ii) at least one anionic surfactant,
iii) optionally a liquid medium, and
iv) optionally further auxiliaries and additives.

9. The composition as claimed in claim 8, wherein the composition comprises 0.01 to 17% by weight, of the cationic poly(ether-urethane), 0.01 to 83% by weight, of the anionic surfactant, 0 to 99.98% by weight, of the liquid medium and optionally further auxiliaries and additives, where the total sum of components is 100% by weight.

10. The composition of claim 8, wherein the at least one anionic surfactant is selected from the group consisting of linear alkylbenzenesulfonates, branched alkylbenzenesulfonates, alkylsulfonates, ether sulfates, xylylsulfonates, alcohol sulfates, phosphate esters, naphthyl sulfonates, secondary alkyl sulfates, α-olefinsulfonates, sulfosuccinates, isethionates, carboxylates, alkylated diphenyl oxide disulfonates, soaps, and combinations thereof.

11. The composition as claimed in claim 8, comprising the liquid medium, wherein the liquid medium is water.

12. A process for preparing the cationic poly(ether-urethane) as claimed in claim 3, the process comprising reacting the at least one polyetherol and the at least one quaternary amine-comprising, tertiary amine-comprising and/or ammonium-comprising diol with the at least one diisocyanate and the at least one short-stopper under an inert gas atmosphere in an aprotic solvent wherein the at least one short stopper is selected from the group consisting of monofunctional amines, water, thiols, and combinations thereof, and wherein, when only the tertiary amine-comprising diol is employed as component B, after incorporating components A-D as monomers in a polymer, the tertiary amine in the tertiary amine-comprising diol monomer is either protonated or quaternized to form the at least one cationic poly(ether-urethane).

13. The cationic poly(ether-urethane) of claim 4, wherein the cationic poly(ether-urethane) has a glass transition temperature of <20° C.

14. The cationic poly(ether-urethane) of claim 4, wherein the cationic poly(ether-urethane) has a glass transition temperature of <15° C.

15. The cationic poly(ether-urethane) of claim 4, wherein the cationic poly(ether-urethane) has a glass transition temperature of <5° C.

16. The cationic poly(ether-urethane) of claim 3, wherein the cationic poly(ether-urethane) has a glass transition temperature of <20° C.

17. The cationic poly(ether-urethane) of claim 3, wherein the cationic poly(ether-urethane) has a glass transition temperature of <15° C.

18. The cationic poly(ether-urethane) of claim 3, wherein the cationic poly(ether-urethane) has a glass transition temperature of <5° C.

* * * * *